Dec. 12, 1933.   D. S. BOND ET AL   1,938,684
TESTING APPARATUS
Filed Sept. 25, 1931
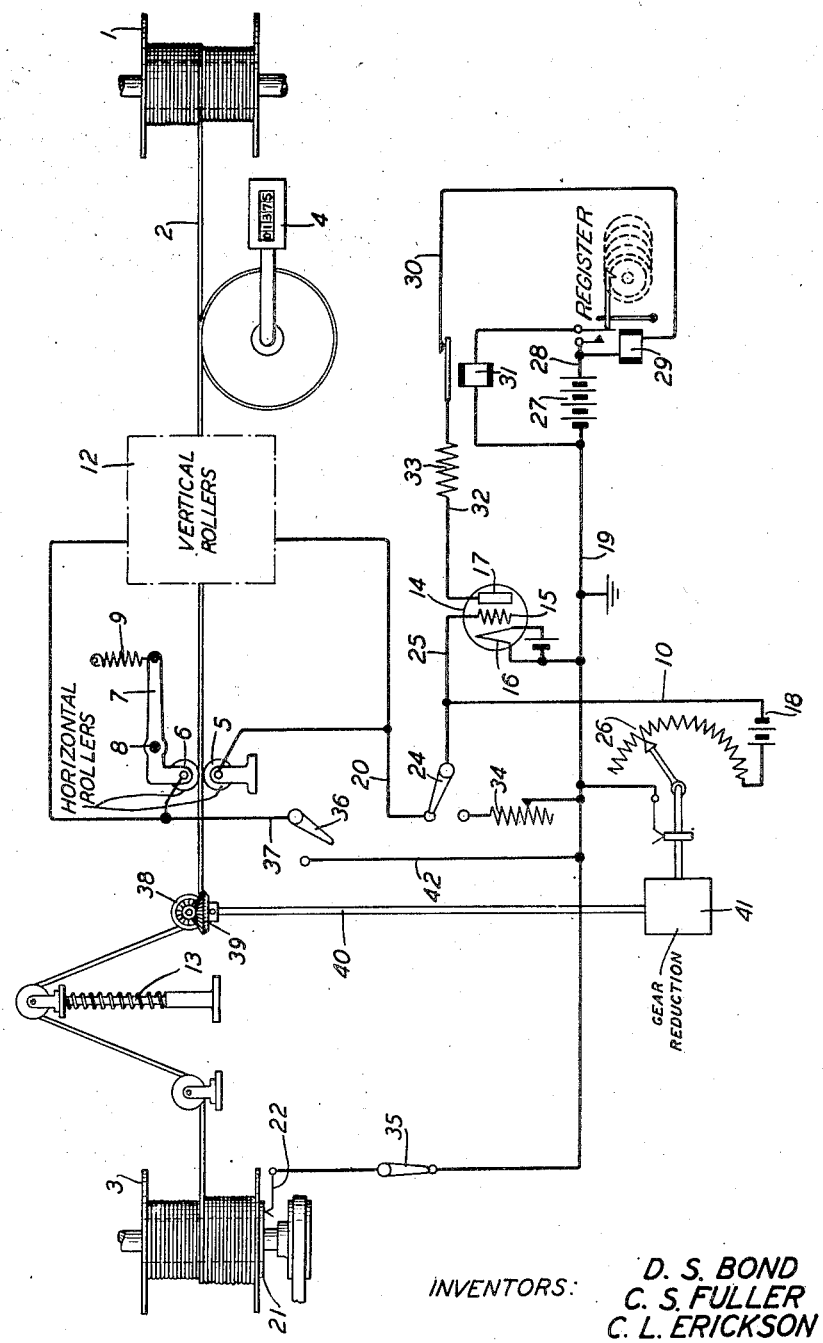
INVENTORS: D. S. BOND
C. S. FULLER
C. L. ERICKSON
BY H. A. Burgess
ATTORNEY Patented Dec. 12, 1933

1,938,684

UNITED STATES PATENT OFFICE 1,938,684

TESTING APPARATUS

Donald S. Bond, Chicago, Ill., and Calvin S. Fuller, Summit, and Charles L. Erickson, Towaco, N. J., assignors to Bell Telephone Laboratories, Incorporated, New York, N. Y., a corporation of New York Application September 25, 1931
Serial No. 565,050

4 Claims. (Cl. 175—183)

This invention relates to the testing of insulation or dielectric materials and more particularly to determining the number of faults in insulation occurring in a given length of wire or the amount of conducting material in a dielectric.

Insulated wire to be used in magnets, relays, inductances, resistances, etc., may have a certain number of imperfections in its insulation and still be satisfactory for the purpose to which it is to be put. By imperfections is meant not only spots of bare or uninsulated wire but also those spots where the insulation is thin and hence the electrical resistance of the insulation is reduced. Such spots may be due to rough places in the wire, dust and slivers, ridges, burrs, etc. When wire having imperfections in its insulation is wound upon spools, the process of winding or the pressure upon the wire after winding may be such as to cause short-circuited turns thereby producing unsatisfactory apparatus.

In the case of dielectrics for condensers, the amount of conducting matter present, such as the number of metallic particles will determine the dielectric value and give an approximate measure of the voltage to which the dielectrics may be subjected.

The number of imperfections or faults which may be present in a given length of material without making it unsatisfactory will depend upon the use to which it is to be put. It is therefore important to be able to determine with accuracy the number of insulation faults present in a given sample of such material. Tests of insulation resistance have been made heretofore using a mercury bath through which the material was run. This method is not as accurate as desired for many purposes because of the fact that the mercury may not always "wet" the material. Further the mercury bath does not permit adjustment of the contact pressure and the test must be made at slow speed.

An object of the present invention is to provide an adjustable high speed accurate means and method of testing the electrical resistance of non-conductors or dielectrics.

Another object is to provide a means for determining the number of places in non-conductors or. dielectrics where the electrical resistance is less than a given value.

The invention will be better understood from the following description and attached drawing forming a part thereof which discloses one form which the invention may take for the determination of faults in insulated wire.

Spool or reel 1 has wound upon it the wire 2 which is to be tested. A second reel 3 driven by an electric motor or other means not shown is the take-up reel upon which the wire is wound after being tested.

Register 4 is calibrated to record the amount of wire passed in units of length.

After passing the register 4 the wire passes between two flat and highly polished rollers 5 and 6. Roller 5 is fixed in position while roller 6 is mounted on arm 7 pivoted and supported at 8. The pressure to which the wire is subjected between rollers 5 and 6 is maintained by a spring 9 which may be adjusted as to tension by any convenient means. The invention is not limited to this means of pressure adjustment but may utilize any other suitable form.

If desired, a second set of rollers may be mounted at 12 with their axes at 90° to the axes of the rollers 5 and 6. Pressure adjustment may be similar to that of rollers 5 and 6 or any equivalent arrangement.

At 13 there is a device for maintaining the wire at a proper tension to permit rapid passage but to limit the tension to a value below that at which the wire may be injured. Such devices are well known and any suitable arrangement may be used.

The electrical registering apparatus includes a space discharge tube 14 containing grid 15, cathode 16 and anode 17. Tube 14 is of the trigger or gas-filled type, that is, one in which no anode or plate current will flow until the potential of the grid has passed a certain critical value in the positive direction. The current flow may be stopped in any suitable manner as by some means external to the tube.

The circuit which controls the grid bias and which includes the wire under test may be traced from the positive pole of battery 18, variable resistance 26 and associated arm, ring and brush, grounded lead 19, switch 35, brush 22, ring 21, wire 2 which is connected to ring 21, and, depending upon the insulation resistance, roller 5, lead 20, upper contact and arm of switch 24, lead 10 to negative pole of battery 18.

The anode current path may be traced from anode current source 27, lead 28, winding of relay 29, lead 30, contact and armature of relay 31, lead 32, which includes resistance 33, anode 17, cathode 16, grounded lead 19, to battery 27.

When relay 29 is energized it closes a circuit from battery 27 through the winding of relay 31 whereby relay 31 is energized opening the anode circuit at its armature and associated contact, to restore tube 14 to unionized condition.

Relay 29 forms a part of a mechanism for registering the number of times anode current flows or as will appear hereinafter, the number of insulation faults in the wire.

As long as no current flows from battery 18 over the circuit including the rollers and wire, previously traced, the potential of the grid of tube 14 is more negative (due to source 18) than its critical value and no anode current will flow. However, when a portion of wire having an insulation resistance less than the required value passes the rollers, current will flow from battery 18 over the circuit already traced and a voltage drop will occur across resistance 26. This causes the potential of the grid to become more positive than its critical value and anode current is permitted to flow through the tube.

The flow of anode current through relay 29 actuates the relay 29 to cause associated suitable mechanism such as a counter to register the operation. Any suitable counter may be used and since such apparatus is well known no description thereof is considered necessary. After a given length of wire has been passed from one reel to the other, the number of operations registered gives a measure of the value of the wire for various purposes.

Also when actuated, relay 29 at its armature and contact closes an obvious circuit through relay 31 from battery 27. Relay 31 upon operating opens the anode circuit at its armature and associated contact thereby preparing the tube for the next insulation fault in the wire.

The advantage of the use of such an arrangement is apparent in the case of a continuous fault. If the tube remained active as long as the grid bias was above a given value, which would be the case with the ordinary vacuum tube, with no external means for breaking the anode circuit a continuous fault regardless of its length would be recorded as but one fault. With applicants' arrangement a continuous fault will cause registering of a continuous series of faults at a rate limited only by the mechanical movements of the relay and register mechanism.

As pointed out above, the pressure existing between the rollers can be adjusted to approximate the conditions under which the wire is to be used.

To determine the resistance value below which the recording mechanism will operate, switch 24 and variable resistance 34 are provided. Before starting the test the arm of switch 24 is moved to its lower contact closing a circuit from battery 18, lead 10, switch 24, resistance 34, brush, ring and arm associated with resistance 26, and resistance 26 to battery 18. Resistance 34 is then set to the limiting value of the insulation resistance and resistance 26 is varied until the potential of grid 15 is at its critical value. The arm of switch 24 is then moved to its upper contact and during the test when a spot in the insulation occurs having a resistance less than that to which resistance 34 was set, the tube will operate causing operation of the counting mechanism.

As the length of the wire wound upon reel 3 increases the resistance between ring 21 and roller 5 increases and this resistance is added to the insulation resistance so that as the test proceeds indication of faults tends to be given not at the limiting value set, but only at increasingly smaller resistance faults. To compensate for this resistance change and hence avoid the errors which would otherwise occur, an arrangement comprising bevel gears 38 and 39, shaft 40, gear reduction 41 and the arm associated with resistance 26 are provided. As the wire passes around the pulley to which gear 38 is attached the arm associated with resistance 26 is moved along resistance 26 to reduce the amount of this resistance included in the grid bias circuit, thereby compensating for the increasing resistance of the tested wire. It is to be understood that other compensation arrangements may be utilized and that applicants are not to be limited to the particular arrangement shown. It is further to be understood that for wires of different materials or gauges, different rates of compensation will be required. This may be adjusted for by a change in gear reduction or by changing resistance unit 26.

For testing dielectrics for the amount of conducting material in them, switch 35 is opened and switch 36 is closed. The control circuit then becomes battery 18, lead 10, switch 24, lead 20, rollers 5 and 6 (or those at 12), lead 37, switch 36, lead 42, grounded lead 19 and resistance 26, to battery 18. Obviously the compensating arrangement is not required in this case and it may be removed from the apparatus by disengaging gears 38 and 39. The value of resistance 26, however, is to be adjustetd as in the case of the wire.

In case the dielectric is in cord form it may be desired to use the second set of rollers indicated at 12. If the dielectric is flat such as tape, only one set of rollers will be used and their size will depend upon the extent of the dielectric.

It is obvious that many variations may be made in the apparatus and circuits described without departing from the spirit and scope of this invention which is to be limited only by the appended claims.

What is claimed is:

1. In an apparatus for testing the electrical conductivity of a material, contact means for engaging said material, a registering mechanism, a control circuit including said contact means and said material, a second circuit controlled by said first circuit to operate said registering means, and means in said second circuit for subsequently opening said second circuit.

2. In an apparatus for testing the electrical conductivity of a material, contact means for engaging said material and adjustable as to contact pressure therewith, a control circuit including said contact means, a second circuit controlled by said control circuit and having associated therewith means for registering flow of current therein and for opening said second circuit.

3. In an apparatus for testing the electrical conductivity of a material, an electrical circuit including a part of said material, a second electrical circuit, a space discharge device by means of which current flow in said second circuit is controlled by current flow in said first circuit, and means included in said second circuit for opening said second circuit subsequently to the establishing of current flow therein under the control action of current flow in said first circuit.

4. In an apparatus for testing the electrical conductivity of a material, rollers between which said material passes, means for adjusting the pressure which said rollers exert upon said material, an electrical control circuit comprising at least one of said rollers, means to cause a current flow in said circuit when a fault passes between said rollers, a trigger type space discharge device comprising a grid, cathode and anode, an anode circuit, means associated with said control circuit and said grid whereby when current of a predetermined value flows in said control circuit said grid attains a potential more positive than its critical value, thereby causing anode current to flow, a relay in said anode circuit operated by said anode current flow, mechanism associated with said relay to register its operation, and means controlled by operation of said relay for opening the anode circuit.

DONALD S. BOND.
CALVIN S. FULLER.
CHARLES L. ERICKSON.